(12) United States Patent
Prades

(10) Patent No.: US 8,298,977 B2
(45) Date of Patent: Oct. 30, 2012

(54) METALLOCENE CATALYST COMPONENTS SUPPORTED ON ACTIVATING SUPPORTS

(75) Inventor: Floran Prades, Linz (AT)

(73) Assignee: Total Petrochemicals Research Feluy, Seneffe, Feluy (BE)

( * ) Notice: Subject to any disclaimer, the term of this patent is extended or adjusted under 35 U.S.C. 154(b) by 477 days.

(21) Appl. No.: 12/300,517

(22) PCT Filed: Apr. 17, 2007

(86) PCT No.: PCT/EP2007/053718
§ 371 (c)(1),
(2), (4) Date: May 11, 2010

(87) PCT Pub. No.: WO2007/131856
PCT Pub. Date: Nov. 22, 2007

(65) Prior Publication Data
US 2010/0249347 A1    Sep. 30, 2010

(30) Foreign Application Priority Data
May 16, 2006 (EP) .................................... 06114029

(51) Int. Cl.
*C08F 4/02* (2006.01)
*C08F 4/642* (2006.01)
*C08F 4/6592* (2006.01)

(52) U.S. Cl. ........ 502/152; 502/103; 502/104; 502/119; 502/120; 502/132; 526/129; 526/137; 526/144; 526/154; 526/160; 526/170; 526/943

(58) Field of Classification Search ............... 502/103, 502/104, 119, 120, 152, 132; 526/154, 158, 526/160, 170, 129, 137, 144, 943
See application file for complete search history.

(56) References Cited

U.S. PATENT DOCUMENTS

| | | | |
|---|---|---|---|
| 6,355,594 B1 * | 3/2002 | McDaniel et al. | 502/152 |
| 6,395,666 B1 * | 5/2002 | McDaniel et al. | 502/87 |
| 7,759,271 B2 * | 7/2010 | Prades et al. | 502/107 |
| 2004/0102312 A1 | 5/2004 | McCullough et al. | |
| 2005/0165183 A1 | 7/2005 | McCullough et al. | |

FOREIGN PATENT DOCUMENTS

WO    WO 2005/075525    *    8/2005

* cited by examiner

*Primary Examiner* — Caixia Lu

(57) ABSTRACT

The present invention discloses a catalyst system consisting of a mono- or di-fluorinated metallocene catalyst component of formula and a fluorinated activating support.

13 Claims, No Drawings

METALLOCENE CATALYST COMPONENTS SUPPORTED ON ACTIVATING SUPPORTS

The present invention discloses the use of catalyst systems based on metallocene mono- or di-fluorides, activated by activating fluorinated support, in order to boost the catalytic activity.

It is known in the art to (co)polymerise ethylene and alpha-olefins in the presence of a catalyst system comprising a metallocene catalyst component and an activating agent. The first developed very active system of that type was based on a zirconocene $Cp_2ZrCl_2$ and an aluminoxane. Further development has led to the preparation of bridged metallocene components, wherein the cyclopentadienyl rings can be substituted in various positions, with substituents of various sizes in order to control the insertion pattern of the growing polymer chain.

The activating agents necessary to activate the metallocene components into catalyst systems are typically based on aluminium or boron, the most commonly used being methylaluminoxane (MAO). MAO however is costly and unstable leading to poor polymer morphology and therefore to reactor fouling and difficult transport conditions.

The most typical technique is to support onto solid supports, homogeneous activators such as MAO as described for example by Chien (J. Polym. Sci., Part A: Pol. Chem., 1991, 29, 1603), or by Collins (Macromolecules, 1992, 25, 1780), or by Soga (Makromol. Chem., 1993, 194, 1745) or by Kaminsky (Makromol. Chem. Rapid Commun., 1993, 14, 239) or such as perfluoroarylborates as described for example in U.S. Pat. No. 5,643,847 or such as perfluoroarylaluminates.

Polymers obtained with these systems have irregular grain size and have high apparent densities, thereby decreasing reactor fouling when compared to homogeneous polymerisation.

These catalytic systems using supported homogeneous activators are less active than equivalent homogeneous systems and the polymer properties are thereby degraded.

A new generation of solid activating supports has been developed and is described for example in Marks (J. Am. Chem. Soc., 1998, 120, 13533): it concerns sulfated zircone particles or also by McDaniel (WO-9960033, WO-0123433, WO-0123434, WO-0144309, WO-0149747 and U.S. Pat. No. 6,548,441) or by Saudemont (FR-A-2765225) or by Prades et al. (WO-5075525). All these activators are solids having surface acid sites that are responsible for the activation. These acid sites are metals combined with halides such as fluor or fluorine or chlorine; metals can be selected from aluminum, titanium, zirconium or nickel.

Compounds such as dimethylaluminium fluoride (DMF) are used as activators in combination with triethylaluminium for the stereospecific polymerisation of propylene with compounds of the metallocene family with low productivity as described by Zambelli (Macromolecules 1989, 22, 2186). They do not activate metallocene complexes.

Patent application WO-0123433 claims a tri-component catalytic system comprising a compound of the metallocene family, an organoaluminium and a fluorinated silica-alumina acting as activator and obtained from a silica-alumina and a fluorinating agent. The surface acid sites are fluoride and aluminum. The drawback of this invention resides in the site definition and in the use of a fluorinating agent.

Patent FR-A-2769245 also claims a tri-component system comprising a compound of the metallocene family pre-alkylated or not pre-alkylated, a co-catalyst that can be selected from alkykaluminium or oligomeric cyclic alkyl aluminoxane and a solid activating support.

Recently, active catalyst systems based on fluorinated metallocene catalyst components have been described in literature. Their method of preparation is described for example in WO-04047971 or in WO-04022230 or in Murphy et al. (Murphy E. F., Murugavel R., and Roesky H. W., in Chem. Rev., 97, 3425-3468, 1997). They have been activated by classical methods with aluminium containing activators and then used in the polymerisation of olefins as described for example in WO-0011047 or in WO-04022607 or in WO-05005488.

There is still a need to develop very active catalyst systems comprising activating supports based on aluminum and fluoride, and wherein the activity is sufficient to suppress the need for an activating agent that degrades the polymer morphology.

It is an aim of the present invention to prepare very active catalyst system.

It is also an aim of the present invention to prepare active catalyst system wherein the activation step is provided by an activating support.

It is a further aim of the present invention to prepare active catalyst systems activated by activating supports having acid sites based on aluminum and fluoride.

It is another aim of the present invention to decrease reactor fouling.

Any one or more of these aims have been at least partially fulfilled by the present invention.

Accordingly, the present invention discloses a catalyst system consisting of a metallocene catalyst component having a fluoride or a fluorine containing leaving group and a fluorinated activating support.

In the present description, catalyst system refers to the active catalyst system.

The present catalyst system is very active as is and does not require the addition of conventional activating agents such as aluminium or boron containing compounds.

The combination of specific catalyst component and fluorinated activating support substantially improves the catalytic activity in the polymerisation of olefins.

The metallocene component is of general formula I or II

wherein Cp is a cyclopentadienyl group, R and R' are each independently selected from hydrogen or hydrocarbyl having from 1 to 20 carbon atoms and two consecutive substituents can be linked together to form a ring, M is a metal group 4 of the Periodic Table, R" is an optional bridge between the two cyclopentadienyl groups or between one cyclopentadienyl group and X, s being 0 when the bridge is absent and 1 when it is present, Q is selected from halogen, hydrogen, alkyl, cycloalkyl and alkoxy having at most 8 carbon atoms and X is an heteroatom selected from groups 15 or 16 of the Periodic Table, preferably N, P or O.

$(CpR_m)$ and $(CpR'_n)$ can each independently be a substituted or unsubstituted cyclopentadienyl, indenyl or fluorenyl group.

Each substituents R or R' may be independently chosen from those of formula $YR_v$ in which Y is chosen from group 14, oxygen and nitrogen and each R is the same or different and chosen from hydrogen or hydrocarbyl of from 1 to 20 carbon atoms and v+1 is the valence of Y. Y is preferably C. The bulk and position of the substituent groups must not affect coordination of the olefin monomer to the metal M. The preferred substituents are alkyl or cycloalkyl or aryl having at most 6 carbon atoms. Most preferred substituent groups comprise methyl, tert-butyl, phenyl. The position of the substituents is selected to provide Cs or pseudo-Cs symmetry for the production of syndiotactic polyolefins, or C1 or C2 symmetry for the production of isotactic polyolefins The structural bridge R" is preferably alkylidene having 1 to 20 aliphatic or aromatic carbon atoms, a dialkyl germanium or silicon or siloxane, alkyl phosphene or amine bridging the two Cp rings. R" is preferably isopropylidene or it comprises the moiety $TR^aR^b$, in which T is chosen from group 14 of the Periodic Table, preferably C or Si and each of $R^a$ and $R^b$ is independently substituted or unsubstituted phenyl linked to T directly or by $C_1$-$C_4$ alkylene. Most preferably R" is an isopropylidine, or dimethylsilyl or a diphenylcarbyl bridge.

Preferably M is zirconium, titanium, hafnium, more preferably, it is zirconium.

Preferably Q is halogen, more preferably it is F.

The preferred metallocene catalyst components that can be used in the present invention are;
Rac-ethylenebis(4,5,6,7-tetrahydro-1-indenyl)zirconium difluoride [Et(THInd)$_2$ZrF$_2$]; rac-ethylenebis(indenyl)zirconium difluoride [Et(Ind)$_2$ZrF$_2$]; isopropylidene(cyclopentadienyl-fluorenyl)zirconium difluoride [iPr(Cp)(Flu)ZrF$_2$];
isopropylidenebis(3-tert-butyl-cyclopentadienyl)zirconium difluoride [iPr(t-Bu-Cp)$_2$ZrF$_2$];
dimethylsilyl(3-tert-butyl-cyclopentadienyl-fluorenyl)zirconium difluoride [Me$_2$Si(3-t-Bu-Cp-Flu)ZrF$_2$];
rac-dimethylsilyl-bisindenyl-zirconium difluoride [Me$_2$Si(Ind)$_2$ZrF$_2$]

Rac-bisindenyl or rac-bistetrahydroindenyl have a rac/meso ratio larger than 200.

The support particles are formed from at least a porous mineral oxide, said particles having been modified in order to carry surface acid sites based on aluminum and fluoride. These sites are obtained by reacting support's surface OH groups with a functionalisation agent and a fluorinating agent.

The activating support is prepared by the steps of;
a) providing a support prepared from one or more porous mineral oxides;
b) optionally heating the support under inert gas;
c) functionalising the support with a solution containing an alkylating agent;
d) heating the functionalised support of step c) under an inert gas and then under oxygen;
e) fluorinating the support with a solution containing a fluorinating agent;
f) retrieving an active fluorinated support.

Optionally the functionalisation and fluorination can be carried out in one step, before heating step d), by providing an appropriate solution containing both a functionalising and fluorinating agent. Fluorination step e) is then cancelled.

The porous mineral oxide is advantageously chosen from silica, alumina and mixtures thereof. Preferably it is silica.

In a first embodiment according to the present invention, functionalisation and fluorination are carried out as two separate steps. The activating supports are then formed by the reaction of —OH radicals carried by the support base particles with at least one functionalisation agent. Any functionalisation agent or mixture thereof as described in FR-2,769,245 can be used in the present invention.

In a preferred embodiment of the present invention, functionalisation and fluorination are carried out in a single step as. In this embodiment according to the present invention disclosed in WO-05075525, the fluorinating step is suppressed and the support is treated with a compound comprising at least one aluminum, one fluor and one organic group, optionally in combination with any one or more compounds selected from MF, MR$^2$, M'F$_2$, M'R$^2$F, or M'R$_{22}$, wherein M is a group 1 metal, M' is a group 2 metal and R$^2$ is an alkyl having from 1 to 20 carbon atoms. The organic group is preferably an hydrocarbyl and more preferably an alkyl having from 1 to 12 carbon atoms. Preferably, the functionalisation and fluorinating agent is of formula

Al(R")$_2$F wherein the R" groups, can be the same or different and are alkyl groups having from 1 to 20 carbon atoms. Preferably, R" is methyl, ethyl, butyl and hexyl, and more preferably the R" groups are the same. The most preferred compound of formula (I) is diethylaluminiumfluoride.

Fluorinated alkylaluminum can be obtained as described in H. Roesky review, Journal of Fluorinated Chemistry, 2003, 122, 125.

The functionalisation agent can be used alone or in combination with any one or more groups selected from MF, MR$^2$, M'F$_2$, M'R$^2$F or M'R$^2$$_2$ wherein M is a group 1 metal, preferably Na, M' is a group 2 metal, preferably Mg and R$^2$ is an alkyl having from 1 to 20 carbon atoms.

The functionalised support is then subjected to a thermal treatment under inert gas such as argon or nitrogen, preferably in a fluidised bed. This heat treatment suppresses organic residues present on the surface and created by the functionalisation agent. It is carried out at a temperature of from 200 to 600° C., preferably of from 350 to 500° C. and more preferably of about 450° C. for a period of time of from 1 to 10 hours.

It is then submitted to an oxygen treatment. The oxidation treatment may advantageously consist of a heat treatment of the functionalised support, in a fluidised bed under oxygen, at a temperature of from 200 to 600° C., preferably of from 350 to 500° C. and more preferably of about 450° C. for a period of time of from 1 to 10 hours. This treatment increases the acidity of the support surface and consequently the performance of the catalytic system.

These treatments are thus necessary to create a support having a sufficient level of acidity to activate the metallocene complex.

The amount of added aluminum and fluoride present in the support at the end of the treatment are respectively of 0.5 to 7 wt %, preferably of from 2 to 5 wt % for the aluminum and of 0.2 to 5 wt %, preferably of from 1 to 3 wt % for the fluoride.

The number of aluminum and of fluoride atoms per nm$^2$ after the two thermal treatments are respectively of 0.25 to 10 Al/nm$^2$, preferably of 0.5 to 4 Al/nm$^2$ and of 0.25 to 20 F/nm$^2$ preferably of 0.25 to 8 F/nm$^2$.

The present invention further relates to a supported metallocene catalyst system for the polymerisation of olefins, comprising:
a) a metallocene catalyst component of formula I or II that is optionally pre-alkylated;
b) optionally an alkylating agent; and
c) a solid fluorinated activating support impregnated with the metallocene catalyst component of step a), said impregnation being carried out before or after the optional alkylation treatment.

The present active catalyst system thus does not require the addition of activating agent and it is very active.

Optionally and if necessary, metallocene component (a) may be subjected to an alkylation treatment. If the activating support is pre-impregnated with the metallocene component (a), this alkylation treatment may take place either before or after the pre-impregnation.

The alkylating agent is an organometallic compound or a mixture thereof that is able to transform a metal-halogen bond into a metal-carbon bond. It can be selected from an alkylated derivative of Al, Li or Mg. Preferably, it is selected from an alkylated derivative of aluminium of formula $$AlR\#_n X_{3-n}$$

wherein the R# groups, may be the same or different, and are a substituted or unsubstituted alkyl, containing from 1 to 12 carbon atoms such as for example ethyl, isobutyl, n-hexyl and n-octyl or an alkoxy or an aryl and X is a halogen or hydrogen, n is an integer from 1 to 3, with the restriction that at least one R# group is an alkyl. Preferably, the alkylating agent is an aluminium alkyl, and more preferably it is triisobutylaluminium (TIBAL) or triethylaluminium (TEAL).

The activating functionalised support, the alkylating agent and the metallocene component are added, in any order, to prepare an active catalyst system.

In one embodiment according to the present invention, the alkylating agent is first added to the activating functionalised support. The metallocene component is then dissolved in an aromatic solvent and added to the treated support.

In another embodiment according to the present invention, the alkylating agent is mixed with the metallocene compound and the mixture is added to the activating support.

The amount of alkylating agent is variable and the ratio Al/M is of from 1 to 10000. The amount of activating support is of from 0.01 to 2000 mg of support per micromole of metallocene component.

One of the main advantages of the present invention is that it does not require the use of aluminoxane in order to activate the metallocene component and thereby avoids the drawbacks of danger and polymer morphology associated with the use of aluminoxane.

This invention also discloses a method for preparing a supported catalyst system that comprises the steps of:
a) providing a functionalised and fluorinated support;
b) subjecting the support of step a) to a thermal treatment under inert gas;
c) subjecting the support of step b) to a thermal treatment under oxygen;
d) dissolving a metallocene catalyst component containing a fluoride or a fluorine leaving group, optionally pre-alkylated, in an organic solvent;
e) optionally, providing an alkylating agent;
f) impregnating the solution of step d) and the optional alkylating agent of step e) onto the support either simultaneously or in any order;
g) retrieving an active supported catalyst system.

The metallocene catalyst component may be pre-impregnated on the activating support.

The present invention also discloses a method for homo- or co-polymering olefins that comprises the steps of:
a) providing the active supported metallocene catalyst system described here-above;
b) injecting a monomer and an optional comonomer;
c) maintaining under polymerisation conditions;
d) retrieving a polymer.

The present invention relates to a process for homo- or co-polymerising ethylene and alpha-olefins, in suspension or in condensed phase or in the gas phase, in the presence of the active supported metallocene catalyst system defined here-above.

The monomers that can be homo- or co-polymerised with the active supported catalyst system according to the present invention are those containing from two to twenty carbon atoms. More preferably ethylene, propylene, 1-butene, 4-methyl-1-pentene, 1-octene, 1-hexene, 3-methyl-1-pentene, 3-methyl-1-butene, 1-decene and 1-tetradecene, or mixtures thereof can be used. Most preferably, the monomers are ethylene and propylene. The comonomers can be polar or non-polar and are preferably selected from ethylene, propylene, 1-butene, 1-octene and 1-hexene.

The polymerisation process is typically carried out in suspension as follows. A suspension of the catalytic system in an inert medium, such as an aliphatic hydrocarbon, is introduced into a reactor. The concentration of the metallocene component (a) is of from 0.25 to 20 µmol/l, that of the optional alkylating agent (b) if present is of from 0.01 to 5 mmol/l and the amount of activating solid support is from 0.5 to 1000 mg/l. The suspension may remain under stirring from a period of time ranging from 5 to 60 minutes either at room temperature (about 25° C.) or at polymerisation temperature. The monomer and optional comonomer are then introduced at a pressure ranging from 1 to 250 bar and the (co)polymerisation is carried out at a temperature of from −20 to 250° C. for a period of time ranging from 5 minutes to 10 hours.

Preferred aliphatic hydrocarbon can be selected from n-heptane, n-hexane, isohexane, isopentane or isobutane.

The preferred polymerisation conditions are as follows:
pressure ranging from 0.5 to 60 bar
temperature ranging from 10° C. to a temperature slightly below the melting point of the polymer, typically 5° C. below the melting point of the polymer.

The polymerisation process may be carried out in condensed phase as follows: monomer and optional comonomer are injected in condensed phase into the reactor at a temperature of from 10 to 110° C. and under a pressure of from 1 to 60 bars, with part of the alkylating agent, acting as a scavenger. The metallocene complex is impregnated on the activating support in the presence of the remaining alkylating agent. The catalytic system is introduced in the reactor either by injection, or as a suspension in a small volume of aliphatic or alicyclic or aromatic hydrocarbon, or dry.

The polymerisation process may be carried out in the gas phase as follows. The monomer and optional comonomer are injected into the reactor at a pressure ranging from 1 to 60 bars, at a temperature ranging from 10 to 110° C. The reactor may be a stirred tank or a fluidised bed reactor. The metallocene catalyst component has been impregnated onto the activating support in the presence of the optional alkylating agent. The catalytic system is introduced into the reactor either by direct injection or by impregnation of a solid charge that is then injected into the reactor.

The polymerisation processes may involve a chain-transfer agent to control the melt flow index of the polymer to be produced. Hydrogen is typically used as the chain-transfer agent, and it is introduced in an amount that can range up to 20 mole % and preferably ranges from 0.01 to 10 mole % in terms of total moles of the olefin/hydrogen combination injected into the reactor.

The supported catalytic systems according to the present invention offer number of advantages.
It has activity and productivity that are substantially higher than those of the dichlorinated or dimethylated counterparts, all other things being equal.
It does not require activation agents such as MAO or perfluoroarylboranes or perfluoroarylborates in combination with alkylaluminium. The activating supports are thus stable and can be stored for very long periods of time.
Reactor fouling is substantially reduced because the polymer particles have controlled morphology.

The polymers obtained according to the present invention have a number average molecular weight Mn, a weight average molecular weight Mw and a polydispersity index D defined as the ratio Mw/Mn that are comparable to those obtained in homogeneous metallocene catalysis. The polydispersity D is of less than 5, preferably of from 2 to 4.

The polymers obtained according to the present invention are characterised by an isocomposition and a homogeneous distribution of comonomer chains, comparable to those obtained in homogeneous metallocene catalysis.

The iso- or syndio-specific polymerisation of alpha-olefins such as propylene with metallocene complexes having respectively a C1 or C2 or Cs symmetry are not affected by the presence of the activating support: they are comparable to those obtained in homogeneous metallocene catalysis.

The polymers obtained according to the present invention are under the form of very full regular grains having a high apparent density. Such excellent morphology was impossible to obtain with the prior art metallocene catalyst systems using methylaluminoxane as activating agent.

The morphology of the final polymer may be further improved if a pre-polymerisation in suspension or preferably in gas phase is carried out, followed by the introduction of the pre-polymer particles in the selected (co) polymerisation process, the level of pre-polymerisation depending upon the subsequent polymerisation process.

The invention also discloses the polymers obtainable with the catalyst system described hereabove.

The invention will now be illustrated by way of examples that do not limit its scope.

EXAMPLES

Several catalyst components based on the same ligand isopropylidene bistetrahydroindenyl have been tested. They are respectively:

rac-isopropylidene bistetrahydroindenyl zirconium dimethyl (THIZrMe$_2$)

rac-isopropylidene bistetrahydroindenyl zirconium dichloride (THIZrCl$_2$)

rac-isopropylidene bistetrahydroindenyl zirconium difluoride (THIZrF$_2$)

In these catalyst components, the ratio rac/meso is of 800.

They were deposited on identical activating support and used for the polymerisation of ethylene under identical polymerisation conditions.

Preparation of Activating Support.

A Grace silica having 500 m$^2$/g surface area was dehydrated overnight at a temperature of 450° C. under nitrogen flow, in order to provide a silica having 1.3 mmol OH/g. In a 250 mL tri-necked flask, 20 g of this dried silica were dispersed in 100 mL of dried toluene. 36 mL of a 20% wt solution DiEthylAluminum Fluoride (DEAF) in Isopare E (2 equivalents with respect to hydroxide) were added drop wised during 30 minutes. This suspension was allowed to stay at room temperature under stirring during 1 hour. This suspension was filtrated on glass filter, porosity 2, and the wet impregnated silica was washed 3 times with 100 mL of pentane. This wet impregnated DEAF silica was dried during 4 hours under vacuum. The support was then treated in a fluidised bed according to the following temperature program:

a) heated from 30 to 130° C. in one hour under nitrogen;
b) kept at a temperature of 130° C. during one hour under nitrogen;
c) heated from 130 to 450° C. in one hour under nitrogen;
d) kept at a temperature of 450° C. during 4 hours, under nitrogen;
e) cooled down to 130° C. in 2 hours under nitrogen.

At this step, the fluidised bed gas was changed to dried air. The same temperature program was applied except that step d) was kept at a temperature of 450° C. during 12 hours. After cooling the support under nitrogen flow, the overall activating support was collected and stored under nitrogen, Ethylene Polymerisation.

Comparative example 1

In a glove box, 1.524 mg of rac-Et(THInd)$_2$ZrMe$_2$ were dissolved in 2 mL of 10% TiBAl solution in hexane. The solution was added to 240,588 mg of the activating support. This suspension was injected after 5 minutes in a stainless 1 gallon reactor, containing 2000 mL of isobutene, 1 mL of TiBAl and 40 mL of 1-hexene. After injection of this suspension, the reactor was kept at a temperature of 85° C. and under a pressure of 23.6 barg of ethylene during 1 hour. After this period of time, 400 g of well formed polymer were obtained. The productivity was of 1660 g/g of catalyst.

Comparative Example 2

In a glove box, 1.344 mg of rac-Et(THInd)$_2$ZrCl$_2$ were dissolved in 2 mL of 10% TiBAl solution in hexane. The solution was added to 240.096 mg of the activating support. This suspension was injected after 5 minutes in a stainless 1 gallon reactor, containing 2000 mL of isobutene, 1 mL of TiBAl and 40 mL of 1-hexene. After injection of this suspension, the reactor is kept at a temperature of 85° C. and under a pressure of 23.6 barg of ethylene during 30 minutes. After this period of time, 271 g of well formed polymer were obtained. The productivity was of 2250 g/g of catalyst.

Inventive Example 1

In a glove box, 1.269 mg of rac-Et(THInd)$_2$ZrF$_2$ were dissolved in 2 mL of 10% TiBAl solution in hexane. This solution was added to 240.096 mg of the activating support. This suspension was injected after 5 minutes in a stainless 1 gallon reactor, containing 2000 mL of isobutene, 1 mL of TiBAl and 40 mL of 1-hexene. After injection of this suspension, the reactor was kept at a temperature of 85° C. and under a pressure of 23.6 barg of ethylene during 30 minutes. After this period of time, 315 g of well formed polymer were obtained. The productivity was of 2650 g/g of catalyst.

As can be seen, the catalyst system of the present invention clearly exhibits a much higher activity than the two other catalyst systems.

The invention claimed is:

1. A process for preparing an active supported catalyst system that comprises the steps of:
   a) preparing a fluorinated support by the steps of:
      i) providing a support prepared from one or more porous mineral oxides;
      ii) optionally heating the support under inert gas;
      iii) functionalising the support with a solution containing an alkylating agent;
      iv) heating the functionalised support of step e) iii) under an inert gas and then under oxygen;
      v) fluorinating the support with a solution containing a fluorinating agent;
   b) subjecting the fluorinated support of step a) to a thermal treatment under inert gas;

c) subjecting the support of step b) to a thermal treatment under oxygen;
d) dissolving in an inorganic solvent a metallocene catalyst component of formula $$R''_s(CpR_m)(CpR'_n)MQF \qquad (I)$$

or $$R''_s(CpR_m)XMQF \qquad (II)$$

wherein Cp is a cyclopentadienyl group, R and R' are each independently selected from hydrogen or hydrocarbyl having from 1 to 20 carbon atoms and two consecutive substituents can be linked together to form a ring, M is a metal group 4 of the Periodic Table, R'' is an optional bridge between the two cyclopentadienyl groups or between one cyclopentadienyl group and X, s being 0 when the bridge is absent and 1 when it is present, Q is selected from halogen, hydrogen, alkyl, cycloalkyl or alkoxy having at most 8 carbon atoms, and X comprises an heteroatom selected from groups 15 or 16 of the Periodic Table, said metallocene component being optionally pre-alkylated;
e) optionally, providing an alkylating agent;
f) impregnating the solution of step d) and the optional alkylating agent of step e) onto the support of step c) either simultaneously or in any order; and
g) retrieving an active supported catalyst system.

2. The process of claim 1 wherein, in the catalyst component, $(CpR_m)$ and $(CpR'_n)$ are each independently selected from substituted or unsubstituted cyclopentadienyl, indenyl or fluorenyl group.

3. The process of claim 1 wherein, in the catalyst component, each R or R' is independently selected from those of formula $YR^\#_v$ in which Y is chosen from group 14, oxygen and nitrogen, each $R^\#$ is the same or different and is chosen from hydrogen or hydrocarbyl of from 1 to 20 carbon atoms and v+1 is the valence of Y.

4. The process of claim 1 wherein, in the catalyst component, R'' is present and is an isopropylidine, or dimethylsilyl or a diphenylcarbyl bridge.

5. The process of claim 1 wherein, in the catalyst component, Q is F.

6. The process of claim 1 wherein functionalisation step a)-iii) and fluorination step a)-v) are carried out in one step, before heating step a)-iv), by providing a solution containing both a functionalising and fluorinating agent.

7. The process of claim 6 wherein the functionalising and fluorinating agent is $Al(R'')_2F$ wherein the R'' groups are the same or different and are alkyl groups having from 1 to 20 carbon atoms.

8. The process of claim 7 wherein the functionalising and fluorinating agent is diethylaluminiumfluoride.

9. The process of claim 1 wherein the metallocene catalyst component is selected from ethylenebis(4,5,6,7-tetrahydro-1-indenyl)zirconium difluoride, ethylenebis(indenyl)zirconium difluoride, isopropylidene(cyclopentadienyl-fluorenyl)zirconium difluoride, isopropylidenebis(3-tert-butyl-cyclopentadienyl)zirconium difluoride, dimethylsilyl(3-tert-butyl-cyclopentadienyl-fluorenyl)zirconium difluoride and dimethylsilyl-bisindenyl-zirconium difluoride.

10. An active supported catalyst system obtained by the process of claim 1.

11. The active supported catalyst system of claim 10 wherein the number of aluminium atoms present in the support per $nm^2$ is of from 0.25 to 10 $Al/nm^2$ and the number of fluoride atoms present in the support per $nm^2$ is of from 0.25 to 20 $F/nm^2$.

12. A process for homo- or co-polymerising olefins that comprises the steps of:
a) providing the active supported metallocene catalyst system of claim 10;
b) injecting a monomer and an optional comonomer;
c) maintaining under polymerisation conditions; and
d) retrieving a polymer.

13. The process of claim 12 wherein the monomer is ethylene or propylene.

* * * * *